B. S. Morgan.
Cultivator.

No. 25,754.   Patented Oct. 11, 1859.

crank-axle

Witnesses;
Martin Southern
Benj't Thorpe

Inventor;
B S Morgan

UNITED STATES PATENT OFFICE.

B. S. MORGAN, OF DELHI, IOWA.

IMPROVEMENT IN CULTIVATORS.

Specification forming part of Letters Patent No. 25,754, dated October 11, 1859.

*To all whom it may concern:*

Be it known that I, B. S. MORGAN, of Delhi, in the county of Delaware and State of Iowa, have invented a new and Improved Cultivator; and I do hereby declare that the following is a full, clear, and exact description of the same, reference being had to the accompanying drawings, making a part of this specification, in which—

Figure 1:
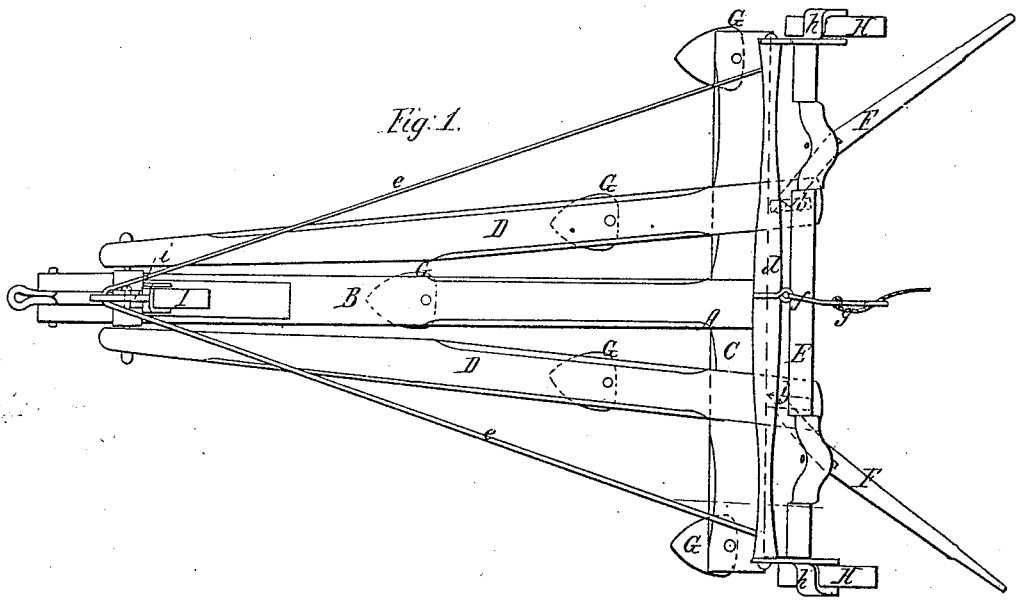
Figure 2:
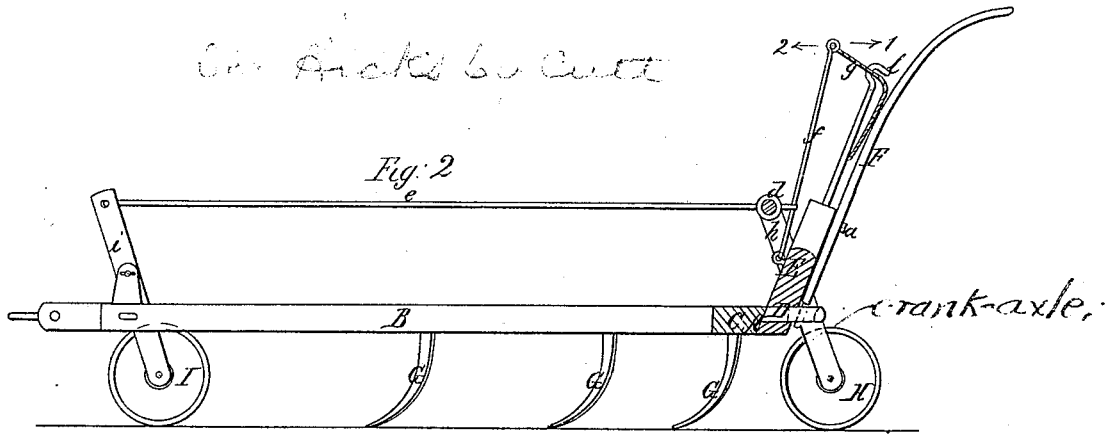

Figure 1 is a plan or top view of my invention. Fig. 2 is a longitudinal vertical section of the same.

Similar letters of reference in both views indicate corresponding parts.

To enable those skilled in the art to make and use my invention, I will proceed to describe it.

A represents the frame of a cultivator, that is constructed of the longitudinal beam B and the cross-beam C, which are united so as to form a cross, as clearly shown in Fig. 1. Hinged to the front end of the beam B are the two side wings, D, that extend through slots over the cross-bar C. A standard, E, is firmly attached to this cross-bar, extending over its whole length and a little inclined backward. This standard supports the handles F, that are secured to the same by means of pivots $a$. Their lower ends extend into slots $b$ in the rear ends of the side wings, D, so that by moving the handles from one side to the other the side wings are spread or brought closer together. Shares G are secured to the frame A and to the side wings, D. This cultivator is intended particularly for weeding such crops as are planted in hills or rows, and in many cases the hills or rows are irregular in width—that is, the same row varies in width—so that a cultivator which can be set to a uniform width only does not reach close up to the hills in those places where the row is wider. This is different with my cultivator, which allows of being spread or contracted instantaneously during the motion of the plow, so that the same can be adjusted to the irregularities of the rows, and that each hill can be reached.

The frame A of my cultivator is supported by the two hind wheels, H H, and the for- wheel, I. These wheels are secured to leve $h\ h\ i$, that are pivoted to the beams B and as clearly represented in the drawings. T upper ends of the levers $h\ h$ are united b⟩ bar, $d$, which connects by rods $e$ with the u per end of the lever $i$. The bar $d$ is operat by a hand lever or rod, $f$, that is hinged to t standard E, and which is adjusted by mea of a cord, $g$, and hook $l$. By throwing t hand-lever $f$ in the direction of arrow 1, F 2, the levers $h\ h\ i$ are turned so as to come a more upright or vertical position, and t frame A is raised. When the hand-lever $f$ thrown in the direction of arrow 2 the fra⟩ A is lowered. It will be noticed that the ra ing as well as the lowering of the frame is do parallel to the ground—that is, the front end of the cultivator is raised or lowered exactly alike with its rear end, and the depth to which the shares cut is therefore increased or diminished equally for all the shares.

Having thus fully described my invention, what I claim as new, and desire to secure by Letters Patent, is—

The arrangement and combination of the side wings, D, and wheels H H I of a cultivator with the levers $h\ h\ i$, bar $d$, rods $e$, a hand-lever $f$, substantially as and for the p⟩ pose specified.

B. S. MORGAN.

Witnesses:
MARTIN SOUTHERN,
BENJN. THORPE.